(12) United States Patent
Hurst

(10) Patent No.: US 12,031,668 B2
(45) Date of Patent: Jul. 9, 2024

(54) SYSTEM AND METHOD FOR LOCATING COMPONENTS

(71) Applicant: Caterpillar Inc., Peoria, IL (US)

(72) Inventor: William James Hurst, Arlington Heights, IL (US)

(73) Assignee: Caterpillar Inc., Peoria, IL (US)

( * ) Notice: Subject to any disclaimer, the term of this patent is extended or adjusted under 35 U.S.C. 154(b) by 411 days.

(21) Appl. No.: 17/245,941

(22) Filed: Apr. 30, 2021

(65) Prior Publication Data

US 2022/0349518 A1 Nov. 3, 2022

(51) Int. Cl.
*F16M 13/02* (2006.01)
*B23K 37/04* (2006.01)

(52) U.S. Cl.
CPC ......... *F16M 13/02* (2013.01); *B23K 37/0408* (2013.01); *Y10T 29/49895* (2015.01)

(58) Field of Classification Search
CPC ........ B23K 13/015; B23K 37/04–0461; B23Q 3/186; B25B 33/00; E04F 21/0092; F16B 5/0088; F16B 5/02; F16B 5/0208; F16B 37/16; Y10T 29/53913; Y10T 29/49895
See application file for complete search history.

(56) References Cited

U.S. PATENT DOCUMENTS

| | | | | |
|---|---|---|---|---|
| 4,378,173 A | * | 3/1983 | Hopwell | F16B 7/105 248/188.5 |
| 5,642,597 A | * | 7/1997 | Hendrickson | E04B 2/7457 52/489.1 |
| 5,697,268 A | * | 12/1997 | Makovsky | B25B 13/5091 81/125 |
| 6,092,271 A | * | 7/2000 | Stojkovic | E05B 17/06 269/904 |
| 9,862,062 B1 | * | 1/2018 | Palmer | B23K 37/0435 |

FOREIGN PATENT DOCUMENTS

| | | |
|---|---|---|
| CN | 2151836 Y | 1/1994 |
| CN | 203863243 U | 10/2014 |
| CN | 204183070 U | 3/2015 |
| CN | 204235025 U | 4/2015 |
| CN | 209716811 U | 12/2019 |
| CN | 210060178 U | 2/2020 |
| FR | 2299939 A1 | 9/1976 |
| FR | 2801001 A1 | 5/2001 |
| GB | 761680 A | 11/1956 |
| WO | 2018098618 A1 | 6/2018 |

* cited by examiner

*Primary Examiner* — Tyrone V Hall, Jr.

(57) ABSTRACT

A system for locating a first component with respect to a second component. The system includes a bracket and a coupling member. The bracket defines a base wall and a side wall. The side wall extends from the base wall and defines an end remote to the base wall. The side wall defines a thickness and a length spanning from the base wall to the end. The coupling member is fastened to the base wall, and is configured to couple the base wall with the first component. The side wall is configured to be brought into contact with the second component to space and locate the second component with respect to the first component by at least one of the thickness defined by the side wall or at least a portion of the length defined by the side wall.

20 Claims, 6 Drawing Sheets

SYSTEM AND METHOD FOR LOCATING COMPONENTS

TECHNICAL FIELD

The present disclosure relates to a system and a method for locating components. More particularly, the present disclosure relates to locating at least two components with respect to each other so that the two components can be joined together. e.g., by welding.

BACKGROUND

In manufacturing and/or repair facilities, joining one component to another, e.g., by welding, is common practice. Whenever two components of appropriate thicknesses are to be welded together along their edges or at an interface defined between the components, the components are generally required to be located and spaced appropriately with respect to each other prior to the start of a welding operation. For example, a minimum gap, such as of 2 millimeters (mm), is desired to be maintained between the two components. Additionally, or optionally, an interface defined between the two abutting components may be located and/or spaced appropriately so as to also provide an adequate weld shelf between the two components. This can prevent complications arising from maintaining an improper gap or weld shelf between the two components, which may cause the weld joint to be developed improperly and/or erratically, thus weakening the weld joint and in turn limiting the adherence or bond between the two components.

Chinese Application CN2151836Y relates to a tool for butt welding. The tool includes a bracket or a support, an adjustable tapered gauge, and a base for the bracket. The gauge is arranged on the bracket or the support, and the base is provided with a magnet. By way of the adjustable tapered gauge, a gap for the butt welding can be maintained.

SUMMARY OF THE INVENTION

In one aspect, the disclosure is directed to a system for locating a first component with respect to a second component. The system includes a bracket and a coupling member. The bracket defines a base wall and a side wall. The side wall extends from the base wall and defines an end remote to the base wall. The side wall defines a thickness and a length spanning from the base wall to the end. The coupling member is fastened to the base wall, and is configured to couple the base wall with the first component. The side wall is configured to be brought into contact with the second component to space and locate the second component with respect to the first component by at least one of the thickness defined by the side wall or at least a portion of the length defined by the side wall.

In another aspect, the disclosure relates to a method for locating a first component with respect to a second component. The method includes providing a bracket that defines a base wall and a side wall. The side wall extends from the base wall and defines an end remote to the base wall. The side wall defines a thickness and a length that spans from the base wall to the end. The method also includes coupling the base wall with the first component by a coupling member and bringing the side wall into contact with the second component to space and locate the second component with respect to the first component by at least one of the thickness defined by the side wall or at least a portion of the length defined by the side wall.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to comparable components used in the same and/or different depicted embodiments.

Figure 1:
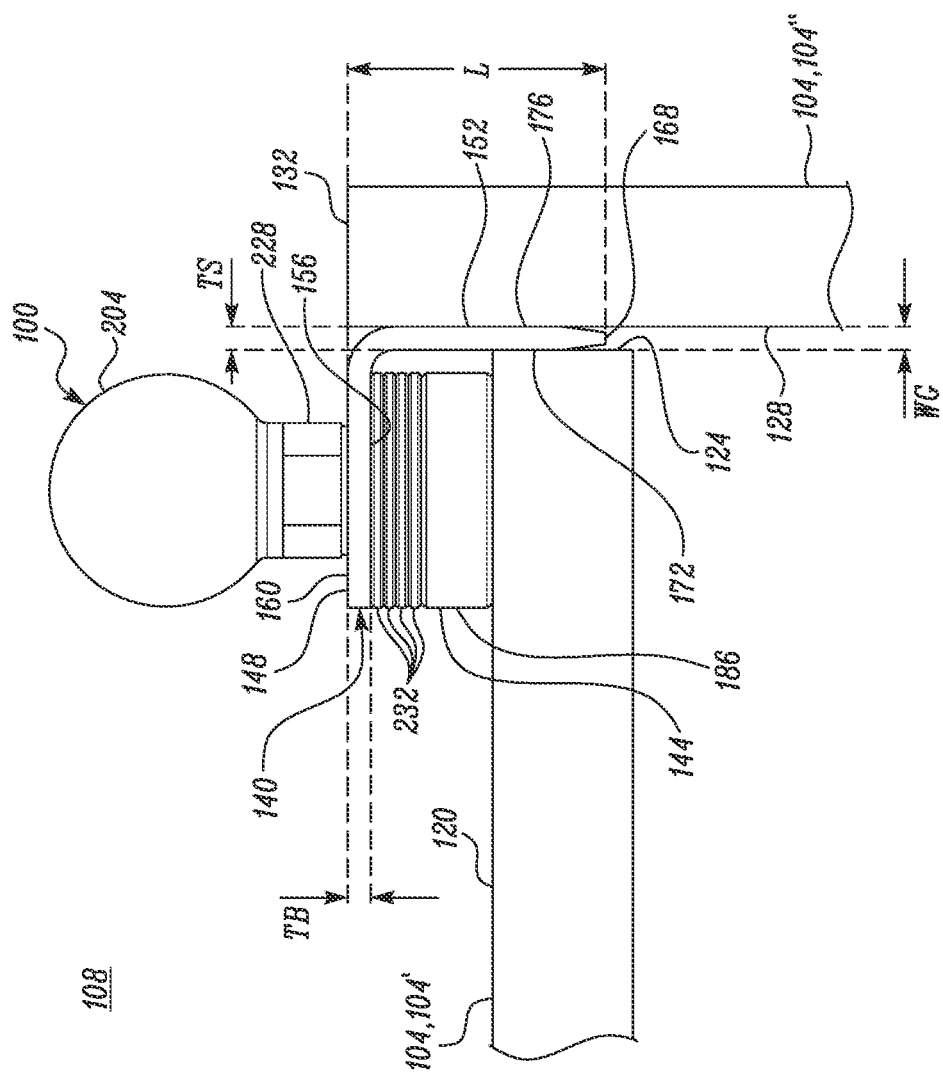
FIGS. 1 and 2 are views of a manufacturing environment in which a system is exemplarily applied for locating a first component with respect to a second component, in accordance with one or more aspects of the present disclosure.
Figure 2:
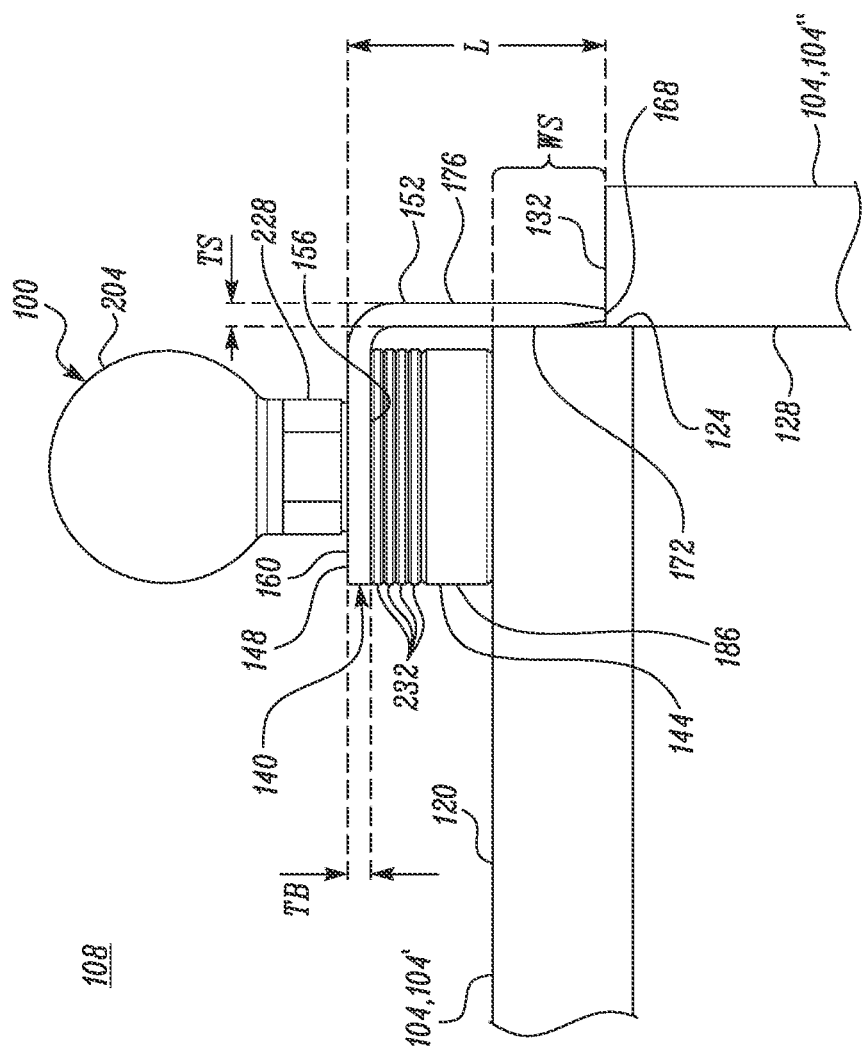
Figure 3:
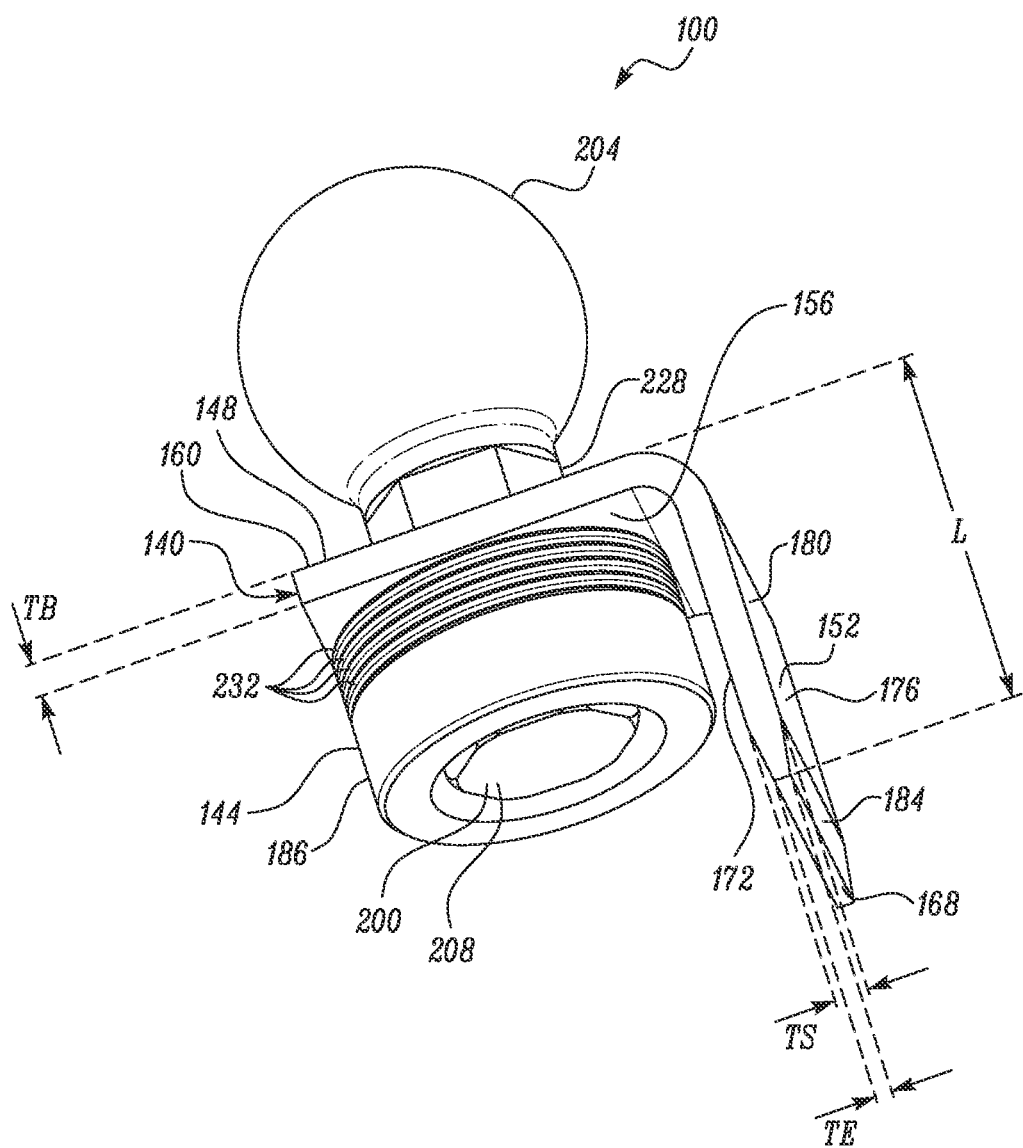
FIG. 3 is an assembled perspective view of the system, in accordance with an aspect of the present disclosure.
Figure 4:
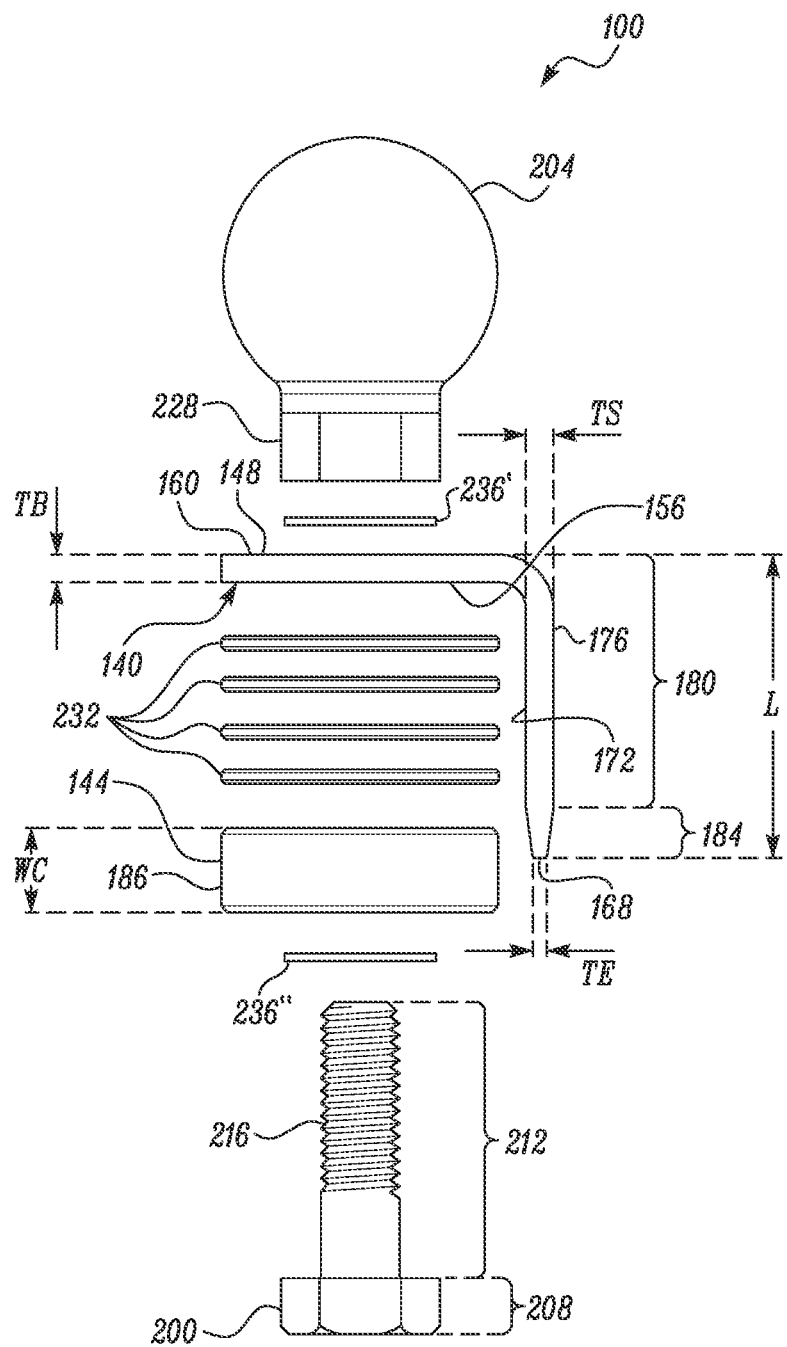
FIG. 4 is an exploded side elevational view of the system, in accordance with an aspect of the present disclosure.
Figure 5:
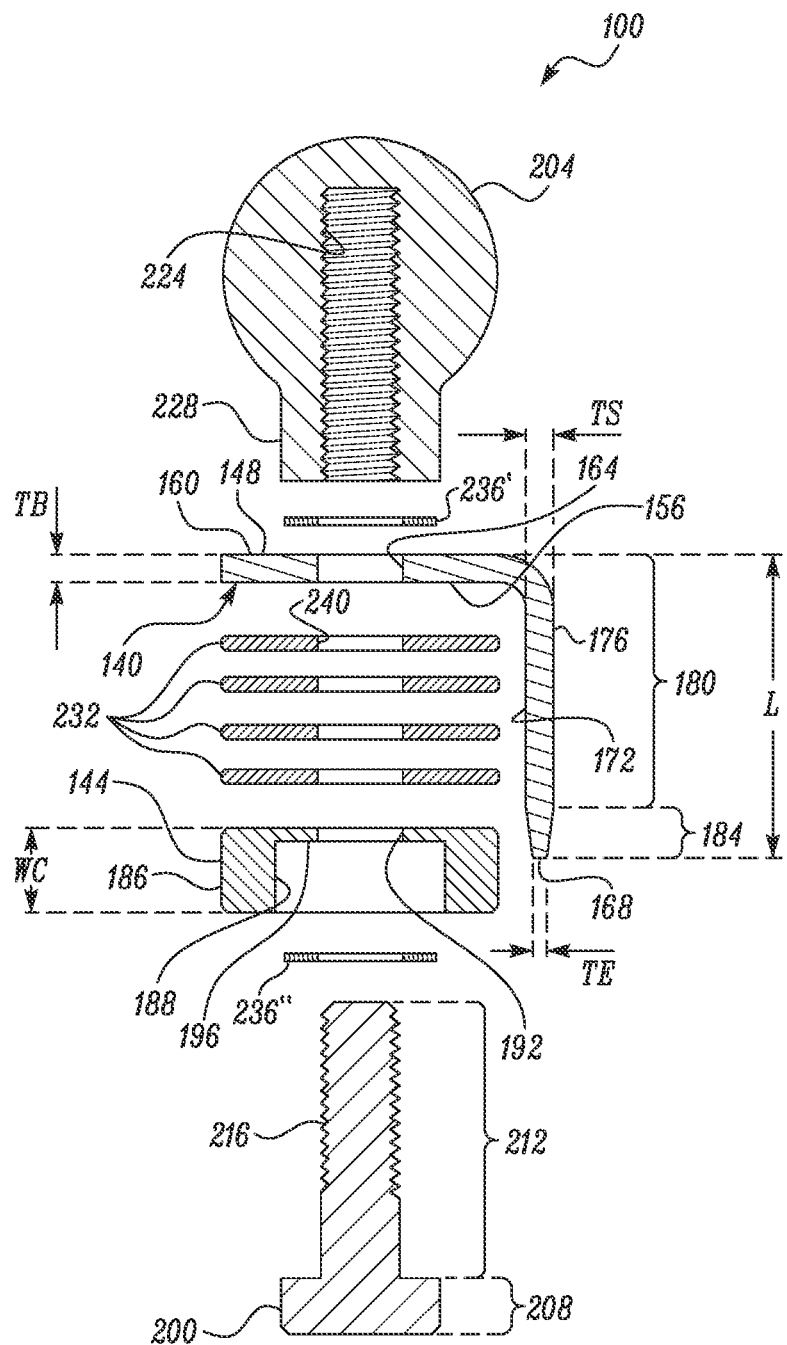
FIGS. 5 and 6 are side cross-sectional views of the system illustrating structural details associated with one or more elements of the system, in accordance with an aspect of the present disclosure.
Figure 6:
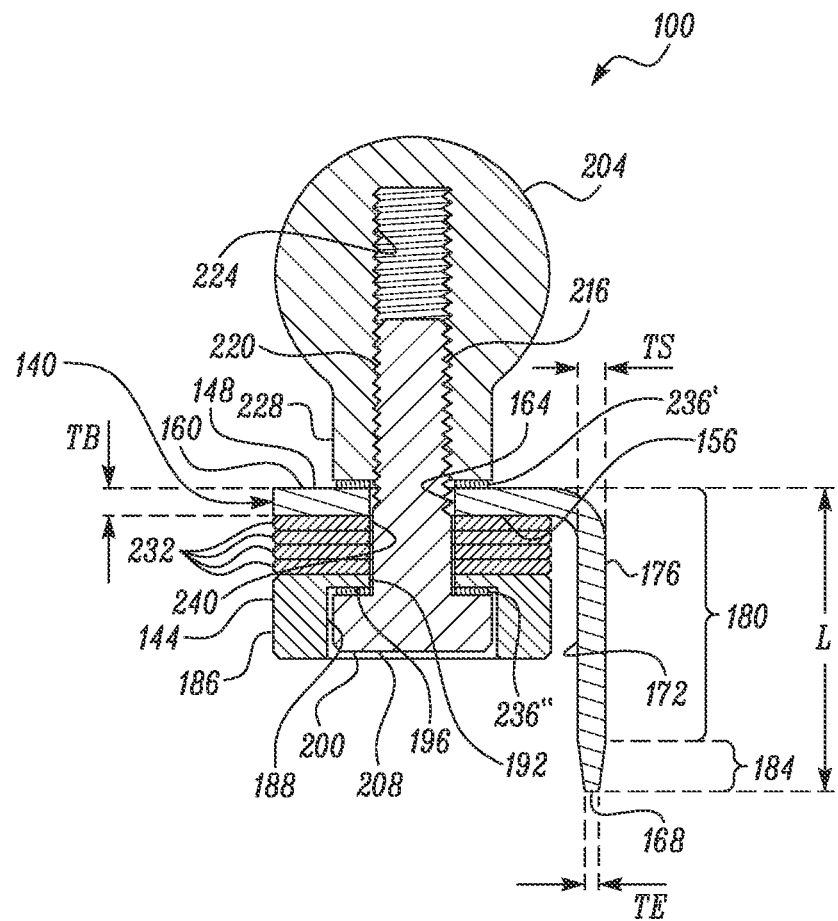

Referring to FIGS. 1 and 2, a system 100 is shown. The system 100 is applied for locating components 104 during a joining of the components 104 to each other, and thus may be applicable in a service facility or a manufacturing environment 108. As an example, the components 104 may refer to or may include two components, e.g., a first component 104' and a second component 104", as shown in FIGS. 1 and 2. The first component 104' may be located with respect to the second component 104" (by use of the system 100), so that once they are located with respect to each other, the two may be joined to each other. Joining of the two components (i.e., the components 104), as referred to in the present disclosure, may refer to a joining operation, such as a welding operation, by which the first component 104' may be fixedly or immovably coupled to the second component 104". Other joining techniques such as bonding and securing with fasteners are within the scope of the disclosure.

The components 104 may include metallic components, and may define surfaces (e.g., planar surfaces) that may be deployed or directed towards each other during the joining or welding operation (e.g., to receive a weld material). For example, the first component 104' may define a first surface 120 and a first edge surface 124. As shown, the first edge surface 124 may adjoin and/or extend from the first surface 120. Although not limited, the first edge surface 124 may extend orthogonally with respect to the first surface 120. The second component 104" may define a second surface 128 and a second edge surface 132. The second edge surface 132 may adjoin and/or extend from the second surface 128. Although not limited, the second edge surface 132 may extend orthogonally with respect to the second surface 128.

According to one aspect, a joining operation of the first component 104' to the second component 104" may include a welding operation in which the first edge surface 124 of the first component 104' is positioned or deployed against the second surface 128 of the second component 104" (see position of the components 104 in FIG. 1), and so that weld material may be deposited between or at an interface defined by the first edge surface 124 and the second surface 128 to join the components 104 to each other. According to another aspect, a joining operation of the first component 104' to the second component 104" may include a welding operation in which the first edge surface 124 of the first component 104' is positioned or deployed against the second edge surface 132 of the second component 104" (see position of the components 104 in FIG. 2), and so that weld material may be deposited between or at an interface defined by the first edge surface 124 and the second edge surface 132 to join the components 104 to each other.

A resulting piece or part as obtained by such joining or welding of the first component 104' to the second component 104" may define a profile, such as a T-shaped profile or an L-shaped profile. Also, a configuration of the components 104 and/or their surfaces, as discussed above, are exemplary, and components with different surfaces, shapes, sizes, and profiles, may be applied in actual applications. Furthermore, the components 104 may be part of the same structure or may be part of different structures in actual applications.

The system 100 is applicable for locating the first component 104' with respect to the second component 104" prior to the start of the joining operation or the welding operation, as already noted above. Such applicability or functionality of the system 100 is exemplarily discussed in conjunction with the first component 104' and the second component 104", and their surfaces, as have been mentioned above. In this regard, and prior to the start of the joining or welding operation, the system 100 may be applied to locate the first component 104' with respect to the second component 104" to either define a weld gap, WG, between the first edge surface 124 and the second surface 128 (see FIG. 1), or may be applied to locate the first component 104' with respect to the second component 104" to define a weld shelf, WS, between the first edge surface 124 and the second edge surface 132 (see FIG. 2).

Based on such applicability or functionality of the system 100, as described in the present disclosure, a myriad of applications of the system 100 may be contemplated by those of skill in the art. For example, in actual practice and use of the system 100, one or more of the first component 104' and the second component 104" illustrated in FIG. 1 may differ from one or more of the first component 104' and the second component 104" illustrated in FIG. 2. Further, it is possible that once a weld gap (e.g., weld gap, WG) or a weld shelf (e.g., weld shelf, WS) is defined between the components 104 and a welding operation performed therebetween, the system 100 may be removed from the interface, turned or re-oriented (by any suitable degree if needed), and applied between different components or different portions of the same components 104 so as to provide the weld gap or the weld shelf between those different components or those different portions of the same components 104, and thus a further aspect of the embodiments being that they can be reused. Therefore, an application of the system 100 with respect to the components 104, as discussed in the present disclosure, need to be viewed as purely exemplary and as suggesting the exemplary use of the system 100 between any two components to locate them either by defining a weld gap between them or by defining a weld shelf between them.

The system 100 includes a bracket 140 and a coupling member 144. Referring to FIGS. 3 to 6, and with continued reference also to FIGS. 1 and 2, the bracket 140 defines a base wall 148 and a side wall 152. The base wall 148 may define a first base surface 156 and a second base surface 160, as shown. The second base surface 160 may be disposed opposite to the first base surface 156. Further, the base wall 148 may define an aperture 164 (see FIGS. 5 and 6) that extends from the first base surface 156 to the second base surface 160 (i.e., the aperture 164 extends across a thickness, TB, of the base wall 148). The side wall 152 extends from the base wall 148 and defines an end 168 remote to the base wall 148. The side wall 152 may also define a first side surface 172 and a second side surface 176, as shown. The second side surface 176 may be opposite to the first side surface 172. The side wall 152 defines a thickness, TS, spanning or extending from the first side surface 172 to the second side surface 176. Further, the side wall 152 defines a length, L, that spans from the base wall 148 all the way up to the end 168 of the side wall 152.

The thickness, TS, may be constant along the length, L, of the side wall 152. According to a non-limiting example, the thickness, TS, may be 2 millimeters (mm) and the length, L, may be 50 mm. In some embodiments, the thickness, TS, may vary along the length, L, of the side wall 152. In some embodiments, the thickness, TS, of the side wall 152 may differ for every unit change in the length, L, of the side wall 152 or the thickness, TS, may differ in regular intervals along the length, L, of the side wall 152, and/or may range from a maximum thickness to a minimum thickness towards the end 168.

According to one aspect of the present disclosure, the side wall 152 defines a first section 180 and a second section 184. The first section 180 may extend from the base wall 148 and may define the thickness, TS, of the side wall 152. The second section 184 may extend from the first section 180 and may taper towards the end 168 such that the end 168 defines an end thickness, TE, (e.g., see FIGS. 3 and 4) lesser than the thickness, TS. The tapered, second section 184 may allow the end 168 of the side wall 152 to pry in and/or be inserted into tight spaces or spatially constrained interfaces existing between multiple parts, panels, or components, with relative ease during operation.

Further, the side wall 152 may extend generally orthogonally with respect to the base wall 148, and may impart an L-shaped profile to the bracket 140, as shown. The term 'generally' has been used to account for manufacturing tolerances. In some embodiments, however, the side wall 152 may extend obliquely with respect to the base wall 148. An oblique extension of the side wall 152 to the base wall 148 may be applicable in cases where one or more of the surfaces of the first component 104' or the second component 104" that define an interface where the weld material may be received during the joining or welding operation are also oblique with respect to their adjoining surfaces—e.g., in case the first edge surface 124 is oblique with respect to the first surface 120 of the first component 104'.

The bracket 140 may be made from a metallic material, although it is possible for the bracket 140 to be made from any other material, such as high grade plastics, polymers, composites, and the like. Although not limited, the base wall 148 and the side wall 152 may be integrally formed, as well. In one example, the base wall 148 and the side wall 152 may be formed by bending different portions of a single piece of sheet metal with respect to one another, so that the different portions of the sheet metal can respectively define the side wall 152 and the base wall 148.

The coupling member 144 is fastened to the base wall 148, e.g., to the first base surface 156 of the base wall 148. Further, the coupling member 144 is configured to couple (e.g., fixedly or immovably but not necessarily permanently) the base wall 148 of the bracket 140 with the first component (e.g., to the first surface 120 of the first component 104'). In some embodiments, the coupling member 144 is configured to couple the base wall 148 to the first component 104' by way of magnetic force. In this regard, the coupling member 144 may include a magnetic coupler 186 that helps attain a fixed or immovable coupling of the base wall 148 with the first component 104' (e.g., to the first surface 120 of the first component 104'). Other coupling techniques such the use of a flexible suction cup member or temporary adhesive also could be employed, for example, if components 104 are not magnetic.

Further, in this regard, the coupling member 144 may define a receptacle 188 and a through-hole 192. The receptacle 188 and the through-hole 192 may be co-axial to each other, may be disposed in succession, and may in unison extend through and across a width, WC, (see FIG. 4) of the coupling member 144, as shown. An interface defined between the receptacle 188 and the through-hole 192 may include a stepped portion 196, as the through-hole 192 may define a smaller cross-sectional area than a cross-sectional area defined by the receptacle 188. Further, in an assembly of the coupling member 144 with the base wall 148 of the bracket 140, the through-hole 192 may be aligned with the aperture 164 defined by the base wall 148.

The system 100 further includes a fastener 200 to fasten the coupling member 144 with the base wall 148. The system 100 also includes a handle 204 that allows the bracket 140 (or the system 100 as a whole) to be held by an operator (not shown).

The fastener 200 may be a bolt and may define a head portion 208 and a shank portion 212. The head portion 208 may include a hexagonal profile (see FIG. 3) or may include sockets (not shown) formed therein (i.e., into the head portion 208) into which an Allen key or a hex key may be inserted to tighten and loosen the fastener 200. The shank portion 212 may include a threaded portion 216. In assembly of the coupling member 144 with the base wall 148, the head portion 208 may rest on the stepped portion 196 and may be seated in the receptacle 188. The shank portion 212 may be passed through each of the through-hole 192 and the aperture 164 (since the through-hole 192 may be aligned, e.g., co-axially, with the aperture 164). In so doing, a passage of the shank portion 212 of the fastener 200 may be facilitated through and across the base wall 148. A segment 220 (see FIG. 6) of the shank portion 212 may extend outward beyond the base wall 148 or outward beyond the second base surface 160 of the base wall 148.

The handle 204 may define a recess 224, which can be threaded so as to mate with the shank portion, and, in assembly of the coupling member 144 with the base wall 148, the shank portion 212 of the fastener 200 (e.g., the segment 220 of the shank portion 212 extending outward beyond the second base surface 160 of the base wall 148) may be received and threadedly engaged into the recess 224 so as to secure the handle 204 against the base wall 148. The handle 204 may define a grasping portion 228 that may include a profile similar to that of a nut (e.g., a hexagonal profile), and which may be configured to be received by a tool (such as a spanner or a wrench) (not shown) for tightening and loosening the handle 204 with respect to the shank portion 212 of the fastener 200.

The system 100 may further include one or more shims 232. The shims 232 may be arranged between the coupling member 144 and the base wall 148, (e.g., the first base surface 156 of the base wall 148). By way of increasing or decreasing the shims 232, a height or a distance of the coupling member 144 from the base wall 148 may be correspondingly increased or decreased, and thus a distance (measured along length, L) by which the end 168 of the side wall 152 may push and/or space the second component 104" with respect to the first component 104' to define the weld shelf, WG, as shown in FIG. 2, may be adjusted.

The shims 232 may be in form of discs or plates, although a variety of other shapes and materials may be contemplated, and said shims 232 may include holes (see hole 240, FIGS. 5 and 6) that may allow the passage of the shank portion 212 of the fastener 200 therethrough. Such passage of the shank portion 212 allows the shims 232 to be retained between the coupling member 144 and the base wall 148. The shims 232 themselves may define differing shapes and/or sizes and need not define the same dimensions or shapes with respect to each other.

The system 100 may also include washers, e.g., a first washer 236' and a second washer 236". The first washer 236' may be arranged between the handle 204 and the base wall 148 and the second washer 236' may be arranged between the head portion 208 and the stepped portion 196.

INDUSTRIAL APPLICABILITY

During operation, as the first component 104' may require to be joined to the second component 104" (e.g., by a welding operation), an operator may bring forth the first component 104' and may position it adjacent to the second component 104". The operator may then choose the type of welding operation to be carried out—i.e., one in which the weld gap, WG, is to be maintained between the first component 104' and the second component 104" or one in which the weld shelf, WS, is to be maintained between the first component 104' and the second component 104".

If it is desired for the weld gap, WG, to be maintained between the first component 104' and the second component 104", prior to the start of the joining or welding operation, the operator may use the system 100 to space and locate the second component 104" with respect to the first component 104' by the thickness, TS, as defined by the side wall 152. As part of an exemplary process to locate the first component 104' with respect to the second component 104" to define the weld gap, WG, the operator may provide the bracket 140, and may fasten the coupling member 144 to the first base surface 156 of the base wall 148.

With regard to an exemplary process to fasten the coupling member 144 to the first base surface 156 of the base wall 148, the operator may position the coupling member 144 against the first base surface 156 such that the through-hole 192 may be aligned with the aperture 164 in the base wall 148 and the receptacle 188 may be directed outwardly or away from the first base surface 156 of the base wall 148. Thereafter, the operator may insert the fastener 200 (with the shank portion 212 entering first) into the receptacle 188. The operator may then push the fastener 200 such that the shank portion 212 enters and passes into the through-hole 192 and the aperture 164. A continued push may cause the segment 220 of the shank portion 212 to pass beyond and across the base wall 148 and be extended and revealed outwardly of the second base surface 160 of the base wall 148. At this point, the operator may make the head portion 208 rest against the stepped portion 196 defined at the interface between the receptacle 188 and the through-hole 192 and may also seat the head portion 208 of the fastener 200 into the receptacle 188.

As part of the same process, the operator may also secure the handle 204 against the base wall 148. In this regard, the recess 224 defined by the handle 204 may receive (e.g., threadably) the segment 220 extended and revealed outwardly of the second base surface 160 of the base wall 148. Once the segment 220 is received within the recess 224, the operator may then grasp or take hold of the handle 204 (e.g., firmly) and may use a socket tool (not shown) to engage the head portion 208 of the fastener 200. Then, the operator may turn the socket tool with respect to the handle 204 to tighten an engagement between the fastener 200 and the handle 204, in turn securing the handle 204 against the base wall 148. Alternatively, or additionally, a tool such as a spanner or a wrench (not shown) may be used to receive the grasping portion 228 of the handle 204 so that as the socket tool may be turned with respect to the tool, a tightening and securement of the handle 204 against the base wall 148 may be achieved.

Once the handle 204 is secured to the base wall 148, the operator may couple the base wall 148 with the first component 104' by way of the coupling member 144. As the coupling member 144 may include the magnetic coupler 186, the coupling between the base wall 148 of the bracket 140 and the first component 104' may be attained by way of magnetic force. Also, said coupling may be attained between the base wall 148 and the first surface 120 of the first component 104', as exemplarily shown in FIGS. 1 and 2. The operator may also ensure that the coupling, as attained by way of the coupling member 144, positions the first side surface 172 in contact (e.g., in total contact or partial contact) with the first edge surface 124 of the first component 104'.

Once the bracket 140 is coupled and the system 100 is positioned in the manner as noted above, the operator may bring the side wall 152 (or the second side surface 176 of the side wall 152) into contact with the second component 104" (i.e., with the second surface 128 of the second component 104") to space and locate the second component 104" with respect to the first component 104' by the thickness, TS, defined by the side wall 152. In so doing, the thickness, TS, of the side wall 152 enables the weld gap, WG, to be defined between the first component 104' and the second component 104" (see FIG. 1). In some cases, additional such systems (such as system 100) may be applied between the first component 104' and the second component 104" such that throughout an interface between the first component 104' and the second component 104", a consistent weld gap, WG, is attained prior to the start of the joining or welding operation.

Conversely, if it is desired for the weld shelf, WS, to be maintained between the first component 104' and the second component 104", prior to the start of the joining or welding operation, the operator may use the system 100 to space and locate the second component 104" with respect to the first component 104' by at least a portion of the length, L, defined by the side wall 152. As part of an exemplary process to locate the first component 104' with respect to the second component 104" to define the weld shelf, WS, the operator may provide the bracket 140, and may fasten the coupling member 144 to the first base surface 156 of the base wall 148 and may position the system 100 with respect to the first component 104' according to the discussion provided above.

Once the bracket 140 is coupled with the first component 104' and the system 100 is positioned in the manner as noted above, the operator may bring the side wall 152 (i.e., the end 168 of the side wall 152) into contact with the second component 104" (i.e., with the second edge surface 132 of the second component 104") to space and locate the second component 104" (or the second edge surface 132 of the second component 104") with respect to the first component 104' (or the first edge surface 124 of the first component 104') by at least a portion of the length, L, defined by the side wall 152. The length, L, of the side wall 152 thus enables the weld shelf, WS, to be defined between the first component 104' and the second component 104" (see FIG. 2). Additionally, or optionally, the operator may also arrange the shims 232 between the coupling member 144 and the base wall 148 to adjust the configuration of the weld shelf, WS. In some cases, additional such systems (such as system 100) may be applied between the first component 104' and the second component 104" such that throughout an interface between the first component 104' and the second component 104", a consistent weld shelf, WS, is attained prior to the start of the joining or welding operation.

In actual practice and application, the system 100 may be repeatedly turned (by any suitable degree) or switched back and forth, as required, between multiple positions and orientations, where in one position or orientation, the system 100 may help define a weld gap (e.g., weld gap, WG) between components and in another position or orientation, the system 100 may help define the weld shelf (weld shelf, WS) between the same or different components. Further, the adjustability offered by the arrangement of the shims 232 makes it easy for the system 100 to define a weld shelf (weld shelf, WS) between components that may include differing shapes, sizes, and designs. The system 100 is also compact, portable, and minimalistic (i.e., includes minimum number of parts), making it easy to handle, store, use, and transport, as and when required.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A system for locating a first component with respect to a second component, the system comprising:
    a bracket defining a base wall and a side wall, the side wall extending from the base wall and defining an end remote to the base wall, the side wall defining a thickness and a length spanning from the base wall to the end; and
    a coupling member fastened to the base wall, the coupling member configured to couple the base wall with the first component,
    wherein the side wall is configured to be brought into contact with the second component to space and locate the second component with respect to the first component by at least one of the thickness defined by the side wall or at least a portion of the length defined by the side wall,
    wherein the side wall defines a first section and a second section, the first section being integrally formed with and extending from the base wall and defining the thickness, the second section extending from the first section and tapering towards the end such that the end defines an end thickness that is less than the thickness.

2. The system of claim 1, wherein the side wall extends orthogonally with respect to the base wall.

3. The system of claim 1, wherein the coupling member includes a magnetic coupler to fixedly couple the base wall with the first component by magnetic force.

4. The system of claim 1 further comprising a fastener to fasten the coupling member with the base wall, the fastener defining a head portion and a shank portion.

5. The system of claim 4, wherein the coupling member defines a receptacle and a through-hole and the base wall defines an aperture aligned with the through-hole, the head portion being seated in the receptacle and the shank portion passing through each of the through-hole and the aperture, facilitating passage of the shank portion through and across the base wall.

6. The system of claim 5 further comprising a handle defining a recess, the shank portion of the fastener being received and engaged into the recess to secure the handle against the base wall.

7. The system of claim 6, wherein the handle defines a grasping portion configured to be engaged by a tool.

8. The system of claim 1 further comprising one or more shims arranged between the coupling member and the base wall.

9. A system for locating a first component with respect to a second component, the system comprising:
   an L-shaped bracket defining a base wall and a side wall, the side wall extending from the base wall and defining an end remote to the base wall, the side wall defining a thickness and a length spanning from the base wall to the end; and
   a coupling member fastened to the base wall, the coupling member configured to couple the base wall with the first component,
   wherein the side wall defines a first section and a second section, the first section being integrally formed with and extending from the base wall and defining the thickness, the second section extending from the first section and tapering towards the end such that the end defines an end thickness that is less than the thickness.

10. The system of claim 9, wherein the side wall is configured to be brought into contact with the second component to space and locate the second component with respect to the first component by at least one of the thickness defined by the side wall or at least a portion of the length defined by the side wall.

11. The system of claim 9, wherein the side wall extends orthogonally with respect to the base wall.

12. The system of claim 9, wherein the coupling member includes a magnetic coupler to fixedly couple the base wall with the first component by magnetic force.

13. The system of claim 9 further comprising a fastener to fasten the coupling member with the base wall, the fastener defining a head portion and a shank portion.

14. The system of claim 13, wherein the coupling member defines a receptacle and a through-hole and the base wall defines an aperture aligned with the through-hole, the head portion being seated in the receptacle and the shank portion passing through each of the through-hole and the aperture, facilitating passage of the shank portion through and across the base wall.

15. The system of claim 14 further comprising a handle defining a recess, the shank portion of the fastener being received and engaged into the recess to secure the handle against the base wall.

16. The system of claim 15, wherein the handle defines a grasping portion configured to be engaged by a tool.

17. A system for locating a first component with respect to a second component, the system comprising:
   a bracket defining a base wall and a side wall, the side wall extending from the base wall and defining an end remote to the base wall, the side wall defining a thickness and a length spanning from the base wall to the end, wherein the side wall is obliquely or orthogonally angled with respect to the base wall; and
   a coupling member fastened to the base wall, the coupling member configured to couple the base wall with the first component,
   wherein the side wall is configured to be brought into contact with the second component to space and locate the second component with respect to the first component by at least one of the thickness defined by the side wall or at least a portion of the length defined by the side wall,
   wherein the side wall defines a first section and a second section, the first section being integrally formed with and extending from the base wall and defining the thickness, the second section extending from the first section such that the end defines an end thickness that is less than the thickness.

18. The system of claim 17, wherein the side wall extends orthogonally with respect to the base wall.

19. The system of claim 17, wherein the coupling member includes a magnetic coupler to fixedly couple the base wall with the first component by magnetic force.

20. The system of claim 17 further comprising a fastener to fasten the coupling member with the base wall, the fastener defining a head portion and a shank portion.

* * * * *